Sept. 2, 1952 K. F. SCHREIER ET AL 2,609,062
AIR AND GAS CLEANER
Filed Dec. 24, 1947 2 SHEETS—SHEET 1

INVENTORS.
Konrad F. Schreier,
BY Ben Bartolucci,

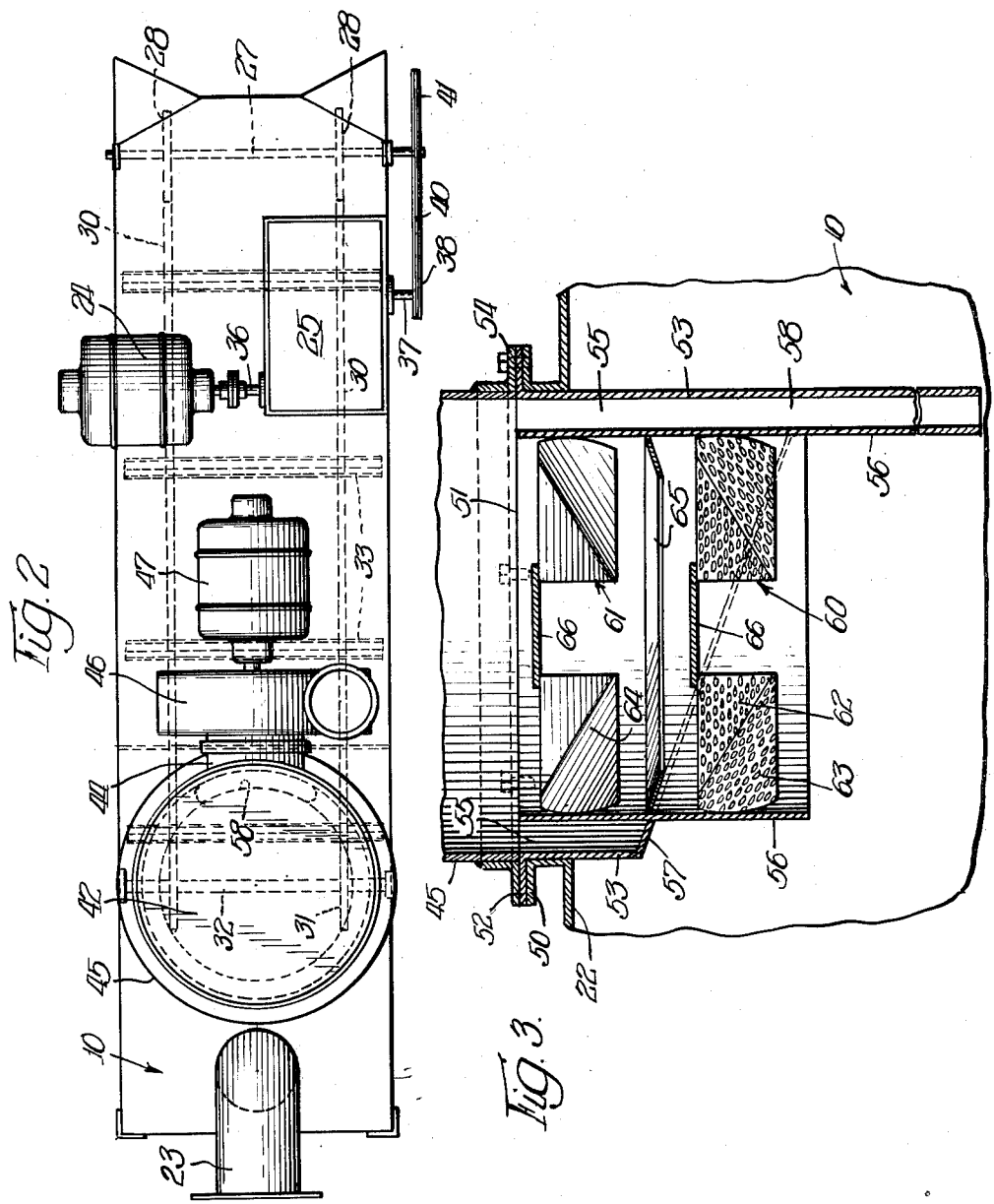

Patented Sept. 2, 1952

2,609,062

UNITED STATES PATENT OFFICE 2,609,062

AIR AND GAS CLEANER

Konrad F. Schreier, Lake Forest, and Ben Bartolucci, Chicago, Ill.

Application December 24, 1947, Serial No. 793,638

2 Claims. (Cl. 183—22)

The invention relates to devices for cleaning gases for dust removal and has for an object to provide an improved filtering device of the liquid type which will clean dust-laden air and other gases by the hydrostatic method wherein the air or gas to be cleaned percolates through a cleaning liquid and is then agitated for removing entrained liquid particles.

In the air filtering device of the invention vane assemblies are employed of the type described and claimed in our copending application Serial No. 671,048, filed May 20, 1946, now Patent No. 2,509,172 granted May 23, 1950, and entitled Fractionating Column or the Like, the said vane assemblies being arranged to provide a plurality of fluid directing surfaces, certain of which are disposed below the normal level of the cleaning liquid, whereas others are located above the normal liquid level. During operation of the present device the dust-laden air is caused to percolate through a body of cleaning liquid in order to pass under a partition member, the air first flowing in a downward direction through the liquid and then in an upward direction. The dust particles washed from the air by this action are collected in the sump provided therefor and mechanically removed by an endless conveyor. Travel of the air in an upward direction takes place through the vane assemblies which cause the air to follow a tortuous and circuitous path, thereby subjecting the same to intensive and repeated contact with wet surfaces to secure the greatest cleaning effect. Following the liquid washing operation the air flows through an eliminator section where liquid particles carried along in the air are removed by the whirling motion imparted thereto and by turbulence of the washed air caused by one or more vane assemblies of the type described.

Accordingly, an object of the invention is to provide a unitary, portable filter for washing dust-laden air and other gases in a novel and improved manner and which will combine high capacity with excellent cleaning efficiency.

Another object of the invention is to provide an air cleaner wherein vane assemblies are combined with improved structure for collecting the entrained liquid removed from the air following its passage through the vane assemblies, the collected liquid being discharged to the sump provided therefor so as to avoid contamination with the main body of cleaning liquid.

Another object of the invention is to provide an air cleaning device having structure for liquid washing the dust-laden air and for removing entrained liquid by whirling and agitating the washed air, the structure operating in an efficient manner wherein the entrained liquid is collected by a trough encircling the vane assemblies and discharged by a depending discharge outlet to a sump so as to cause the least disturbance to the main body of the cleaning liquid.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 2 is a top plan view of the air and gas cleaner shown in Figure 1; and

Figure 3 is a fragmentary vertical sectional view taken through the vane assemblies and showing the formation and arrangement of the vane members.

Figure 1:
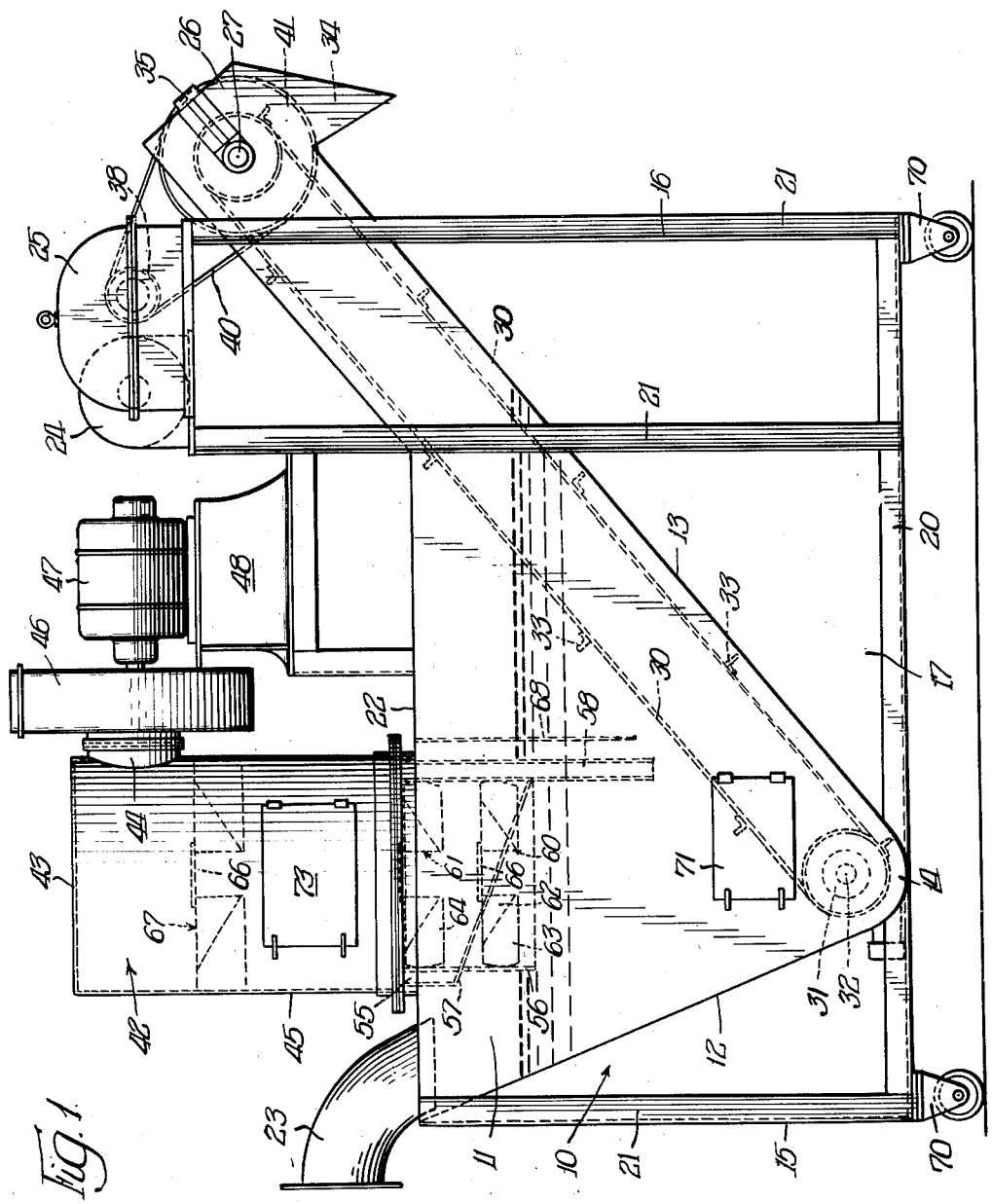
Figure 1 is a side elevational view of the portable air and gas cleaner embodying the improved features of the present invention, the liquid level illustrated showing the level of the liquid when the device is inoperative.

Referring to the drawings, the embodiment selected for illustrating the present invention consists of a container 10 of substantially rectangular shape for containing a body of cleaning liquid 11, the container providing sloping bottom walls 12 and 13 which form a receptacle with the container for the cleaning liquid and provide a sump 14. The container essentially consists of end plates 15, 16 and side plates 17, 18 with horizontal and vertical reinforcing angle members 20 and 21, respectively, located along the side edges of the container for strengthening and reinforcing the same. The top wall 22 of the container is provided at the left hand end with an air inlet 23 for dust-laden air to be cleaned and which admits the air to the container above the normal level of the cleaning liquid, as clearly evident from the drawings.

At the right hand end of the container, as shown in Figure 1, the angle members and the side and end walls extend above the top wall 22 to provide supporting means for the electric motor 24, the mechanism 25 comprising speed reducing means and the extension plates 26 which journal the operating shaft 27. The shaft 27 carries the spaced sprockets 28 which receive the endless chains 30 extending within the receptacle for the cleaning liquid for operative connection with companion sprockets 31 journalled by shaft 32 located in the sump 14. The endless chains 30 are connected by scrapers 33 in the form of angle members and which therefore travel to and from the sump 14 and to a location exteriorly of the container. The conveying action of the scrapers is made possible by the parallel arrangement of the endless chains 30 with respect to the sloping bottom wall 13 so that the scrapers in moving away from the sump travel along the bottom wall 13 and the material collected by them is thus conveyed to the discharge opening 34. The operating shaft 27 is provided with adjustment means 35 by which the tension on the endless chains can be regulated. The motor 24 constitutes the driving means for the chains, the motor having its shaft 36 operatively connected to the speed reducing mechanism 25, the shaft 37 of which is provided with sprocket 38 connected by the endless chain 40 with sprocket 41 fixed to the operating shaft 27.

In accordance with the invention the container 10 is provided with an eliminator section 42 which is preferably cylindrical in shape, although not necessarily so, having a top wall 43 and an open bottom. An outlet 44 for the washed air has connection with the cylindrical wall 45 of the eliminator section adjacent the top thereof and said outlet communicates in turn with a fan chamber 46 containing an exhausting fan of the conventional type, not shown, for withdrawing the washed air from the eliminator section, the exhaust fan being driven by the electric motor 47 mounted on the base 48 which is suitably supported by the container 10 forming therewith an integral unit.

The open bottom end of the eliminator section is disposed in alignment with a flanged opening provided in the top wall 22 of the container, said opening having the horizonally disposed flange 50, Figure 3, which supports the eliminator section, there being interposed between the bottom edge 51 of the eliminator section and said flange 50 a second flange 52 extending horizontally and being integral with the outer cylindrical wall 53 of the trough to be presently described. The joining of the eliminator section to the container 10 is completed by the annular member 54 of angle shape in cross section.

It will be observed by reference to Figure 3 that the outer cylindrical wall 53 forms a trough 55 with an internal cylindrical wall 56 which for its entire extent depends below wall 53 forming in effect a partition wall since the same terminates below the normal level of the cleaning liquid in the container. Therefore the dust-laden air admitted to the container by inlet 23 must percolate through the cleaning liquid and pass under the partition wall 56 in order to reach the entering passageway to the eliminator section.

The trough 55 is completed by the bottom wall 57 which joins the outer cylindrical wall 53 to the partition wall 56. In accordance with the invention the bottom 57 of the trough 55 has a definite slope in a direction toward the right for the purpose of draining liquid collected by the trough to the discharge opening 58. The discharge opening results since the bottom 57 terminates at points spaced a distance apart, as evident from Figure 2, and for purposes which will be clearly apparent as the description proceeds this discharge opening is continued downwardly toward the sump 14 by a continuation of the outer cylindrical wall 53 and the inner partition wall 56. The discharge opening extends downwardly for some distance into the base of the receptacle containing the cleaning liquid since it is desired to discharge the liquid collected by trough 55 at a low point in the body of cleaning liquid relatively adjacent the sump 14 and in a manner so that this discharge liquid will not contaminate the main body of cleaning liquid.

A plurality of vane assemblies are located within the cylindrical partition member 56 providing the entering passageway to the eliminator section. As shown in the drawings, two vane assemblies identified by numerals 60 and 61 are suitably secured to the inside of the annular wall 56, being disposed in superposed relation, each assembly consisting of a plurality of vane members extending radially outward from the center. Although only two vane assemblies are shown in the present embodiment, it is, of course, understood that a larger number may be employed with one or more being immersed in the cleaning liquid and having perforated vane members. Each assembly is substantially identical insofar as the formation and radial disposition of the vane members is concerned. Each vane member is bent to provide two fluid directing surfaces 62 and 63 and which are angularly disposed with respect to one another. Surface 63 terminates at the curved outer edge of the vane member and is of such radius or curvature as to closely fit the curved surfaces of cylindrical member 56 when in assembled relation within the entering passageway thereof. The fluid directing surfaces 63 are inclined at an angle to the vertical which thus locates the fluid directing surfaces of each vane at a greater angle to the vertical since the surfaces have been described as angularly disposed with respect to each other. It will be observed that surface 63 is of greater area than 62 and both may be described as inclined in a radial direction and also in an axial direction so that the bend 64 where the surfaces meet in a straight line likewise has a similar inclination. Adjacent vane members in each assembly overlap to a substantial extent in order to define channel-ways for the passage of the pair undergoing cleaning as well as the cleaning liquid agitated thereby. The vane assemblies employed in the present device are similar to those described and claimed in our copending application Serial No. 671,048, now Patent No. 2,509,172, herein identified, and reference is made to that case for a more complete description of the vane members and the cleaning action resulting therefrom.

One or more vane assemblies are immersed in the cleaning liquid to provide for directional control of the air as it percolates through the cleaning liquid, said vanes as a result of their directing surfaces additionally functioning to break up and shatter the air bubbles during flow through the liquid to thus improve the cleaning effect since the air in a more finely divided condition is brought into intimate contact with the cleaning liquid.

A collar 65 of annular formation may be located between vane assemblies 60 and 61. The collar is preferably secured to the inside wall of cylindrical member 56 and it will be seen that the collar has a downward inclination in a radial direction toward its center. The collar thus functions to act as a deflecting member with respect to the air caused to strike the same as a result of the whirling motion imparted to the air by its passage through the channel-ways of the vane assembly 60. Whereas collar 65 constitutes an outer annular member or baffle extending around the periphery of the vane members, there is located above each vane assembly a center plate 66 which also functions as a baffle. The plates 66 prevent channeling of the air centrally of the vane assemblies and have the effect of directing the air outwardly toward the periphery where it is caused to contact the vane members to produce the cleaning effect described.

The washed air upon leaving the vane assembly 61 will have a whirling motion so that in general the washed air will tend to flow toward and contact the cylindrical wall of the eliminator section 42. This contact of the washed air with the side walls of the eliminator section will result in the removal of a major portion of the entrained liquid. Said liquid comprises particles picked up by the air and carried along with the same as a result of its velocity and which are removed since the whirling motion of the washed air causes the particles to contact the side walls of the eliminator section and separate therefrom. The separated liquid particles agglomerate on the walls 45 and eventually trickle down the sides to flow into the trough 55. The trough is provided for the purpose of collecting this liquid and for discharging the same through the discharge opening 58 into the sump of the container without disturbing or contaminating the main body of cleaning liquid. It will be seen that the outer cylindrical wall 53 of the trough is substantially a continuation of the cylindrical walls 45 of the eliminator section. Also the bottom 57 of the trough is sloped as described for draining the collected liquid to the discharge opening.

As a final eliminator of the entrained liquid in the washed air the invention provides a vane assembly 67 located intermediate the eliminator section and below the outlet 44. This vane assembly is similar in all respects to the vane assemblies previously described since the same is made up of vane members radially disposed and which are secured at their outer edge to the wall of the section. Each vane member of this assembly is bent to provide two fluid directing surfaces which meet in a straight line inclined radially and vertically as are also the said fluid directing surfaces. The central plate 66 is suitably secured to the top inner edges of the vane members of this assembly, the same functioning to prevent channeling of the washed air centrally of the vane assembly. Accordingly, in operation the washed air in flowing upwardly through the eliminator section will contact the vane members of assembly 67 and any liquid particles still remaining in the air will be separated therefrom. The inclination of the fluid directing surfaces is such as to flow the separated liquid to the walls of the eliminator section and this liquid upon trickling down said walls is likewise collected by trough 56 and disposed of as previously described.

In operation of the air and gas cleaner of the invention the dust-laden air to be cleaned is delivered though inlet 23 to the container under a slight pressure and with the exhausting fan within in chamber 46 operating to produce a sub-atmospheric pressure within the eliminator section the liquid will flow into the section until the liquid level in the container 10 reaches the lower edge of 56. When this happens the air above the liquid will be drawn into the eliminator section and will flow upwardly through the liquid. The abrupt change in flow from a downward to an upward direction facilitates the settling out of the greater and heavier dust particles. These particles gravitate toward the sump 14 to be eventually removed by the scrapers 33.

The air in flowing upwardly through the entering passageway to the eliminator section is agitated by the vane assemblies 60 and 61 which shatter or break up the air bubbles, thereby subjecting the air to a thorough cleaning. The eliminator section functions to remove liquid carried along with the washed air as small particles and this liquid is collected by the trough 55 and discharged to the sump at a point relatively adjacent thereto and in a manner which substantially prevents this dirty liquid from contaminating the main body of cleaning liquid.

As a further precautionary measure a dividing partition 68 depends from the top wall 22 of the container into the cleaning liquid and extends transversely of the container. In effect the dividing partition 68 separates the body of liquid on the left, through which the dust-laden air is caused to percolate, from the body of liquid on the right from which the dust particles are being removed by the scrapers 33. The action of the scrapers in removing the sediment from the sump has a tendency to contaminate the cleaning liquid to the right of the partition so that the function of the dividing partition 68 is readily apparent. The dividing partition also seals off the left half of the container and prevents escape of the dust-laden air which is thereby caused to flow through the liquid to the entrance passageway of the eliminator section.

The container 10 may be provided with the roller assemblies 70 to facilitate the portability of the present air and gas cleaning device. The side wall 17 of the container may be provided with a trap door 71 which may be opened to provide convenient access to the shaft 32 and other mechanism in the sump of the container for repair purposes. Likewise the eliminator section 42 is provided with a trap door 73 for similar purposes. In accordance with the invention the trough 55, vane assemblies 60 and 61, and outlet 58 together with the depending discharge tube provided in connection therewith are formed as a unit which can be inserted within the open end of the container 10 and dropped into place since it will be seen that the unit is supported by the annular flange 52. The structure also facilitates removal of the unit for repair since it is only necessary to remove the eliminator section and the cleaning unit can be lifted from the container.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. A cleaning device for air and the like, in combination, a container for a cleaning liquid, an eliminator section above the liquid and supported by the container, said container having an inlet for air located above the liquid level and said eliminator section having an outlet for washed air also located above the liquid level, an annular partition wall depending from the eliminator section into the cleaning liquid, whereby dust-laden air in order to enter the eliminator section must pass under the partition, a second wall encircling the partition wall and comprising a continuation of the wall of the eliminator section, a sloping bottom for said second wall which thereby forms a trough with the partition wall whereby liquid previously entrained in the washed air and deposited on the walls of the eliminator section will flow down said walls and be collected by the trough, and an outlet for the trough located at the lowest point thereof, said outlet depending into the cleaning liquid and terminating a distance below the bottom of said annular partition wall.

2. A cleaning device for air and the like as defined by claim 1, additionally including a plurality of vane assemblies disposed in superposed relation within and concentrically of the annular partition wall, at least one of said vane assemblies having location below the normal liquid level and being immersed in the cleaning liquid and wherein said container provides a sump located below and in subtantial alignment with said vane assemblies.

KONRAD F. SCHREIER.
BEN BARTOLUCCI.

REFERENCES CITED

The following references are of record in the file of this patent:

UNITED STATES PATENTS

| Number | Name | Date |
|---|---|---|
| 1,114,874 | Fox | Oct. 27, 1914 |
| 1,170,069 | Ihrig | Feb. 1, 1916 |
| 1,214,372 | Romberger | Jan. 30, 1917 |
| 1,447,336 | Baughman | Mar. 6, 1923 |
| 1,650,152 | Perry | Nov. 22, 1927 |
| 1,876,465 | Misner | Sept. 6, 1932 |
| 2,380,065 | Newcomb | July 10, 1945 |